P. MUELLER.
PIPE FLANGE.
APPLICATION FILED OCT. 15, 1909.
1,034,725.
Patented Aug. 6, 1912.
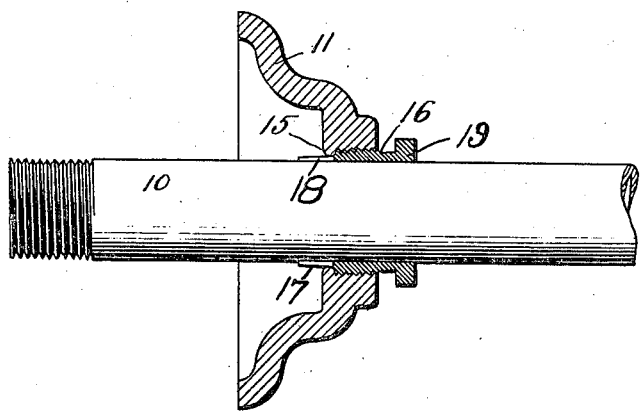
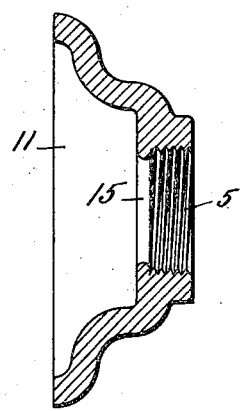
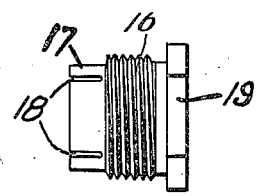
Inventor
Philip Mueller
By Meyers, Cushman & Rex
Attorneys
Witnesses Mueller, a
UNITED STATES PATENT OFFICE.

PHILIP MUELLER, OF DECATUR, ILLINOIS, ASSIGNOR TO H. MUELLER MANUFACTURING COMPANY, OF DECATUR, ILLINOIS, A CORPORATION OF ILLINOIS.

PIPE-FLANGE.

1,034,725.  Specification of Letters Patent.  Patented Aug. 6, 1912.

Application filed October 15, 1909. Serial No. 522,872.

*To all whom it may concern:*

Be it known that I, PHILIP MUELLER, a citizen of the United States, residing at Decatur, in the county of Macon and State of Illinois, have invented new and useful Improvements in Pipe-Flanges, of which the following is a specification.

My invention relates to pipe flanges of the type commonly used on pipes at the points where they pass through openings in walls. The particular walls referred to are the walls of plumbing fixtures, though my invention may be used with equal facility on pipes passing through ceilings and floors, and on such pipes as support gas and electric light fixtures, or on any other connection.

My invention consists of a novel means used in combination with a pipe flange for fixing the flange on the pipe, the means now commonly used comprising a simple set screw passing through the body of the flange or a collar formed thereon at the pipe opening. The means which I use is a flange having an enlarged threaded pipe-opening therethrough and an inwardly extending annular bead at the inner end of the pipe-opening, and a bushing adapted to surround the pipe and having external threads engaging the threads in the pipe-opening and being provided with a tapering slitted portion passing through the bead or rib and adapted to be compressed thereby against the pipe.

The details of construction of my invention and its various advantages will fully appear from the following description, taken in connection with the accompanying sheet of drawings, in which—

Figure 1 is a sectional side elevation of a pipe equipped with my flange and bushing. Fig. 2 is a detail sectional view of the flange. Fig. 3 is a detail sectional view of the bushing.

Referring to the drawing, 10 is a pipe on which is mounted the flange 11, the type used in connection with plumbing fixtures at the point whereby the pipe passes through the wall of the fixture. This flange is held in place on the pipe by a bushing or annular member 16, which fits the pipe closely and is screw-threaded into the hole in the flange through which the pipe passes.

The flange 11, as may be seen from Fig. 2, has an enlarged screw-threaded pipe-receiving opening 5 of uniform diameter throughout, and an interior annular bead or rib 15 at the inner end of the pipe-opening serving as a means for contracting the opening at its inner end.

The bushing 16, as shown in detail in Fig. 3, is provided with screw threads about its middle adapted to intermesh with the screw threads of the pipe-opening in the flange, the threads being substantially straight as in a standard fixture. The entering end of the bushing beyond the screw threads is tapering as at 17, and is divided by a plurality of slits 18 which may extend any desired distance from the end of the bushing. When this bushing is screwed home within the pipe-opening, the bead or rib 15 acting on the tapered end forces the end of the bushing into firm contact with the pipe, and the flange is clamped securely in position. As usual, the bushing 16 is provided with a hexagonal or other angular head 19 on its outer end to accommodate a wrench.

Thus it will be observed that I have produced an extremely convenient and efficient means for securing the flange to a pipe. Firm frictional contact is had with the pipe and the bushing is thus securely clamped in place, there being small chance of its working loose. It is moreover a very neat and attractive construction, and is quite sanitary. As the bushing when screwed home accurately fits the pipe and necessarily fits the flange, there are no cracks or seam openings between the pipe, the bushing, and the flange. Moreover no threads are exposed, they being entirely covered by the flange as shown in Fig. 1, the smooth cylindrical surface adjacent the head of the bushing being the only protruding part of the body. Dirt, therefore, does not get where it cannot be removed. I prefer to make the head of the bushing with well rounded corners and when so made there is no projecting part which is unsightly or in the way. It will be observed that the essence of my invention lies in the fact that the bushing is elastic and capable of being compressed by the flange about the pipe.

While I have described the best form of my invention now known to me, of course many modifications may be made by any skilled mechanic without departing in any wise from the generic spirit of my invention. I desire to cover all these modifications in the annexed claim.

What I claim is:

A pipe flange structure comprising a flange having a screw-threaded opening of uniform diameter therethrough and adapted for loose engagement about a pipe, the flange further having an annular rib projecting into the inner end of said screw-threaded opening, a bushing snugly embracing the pipe and engaging the opening in the flange, the bushing having external screw threads midway between its ends adapted for engagement with the internal screw threads of the flange whereby the bushing is moved into the opening of the flange, the inner end of the bushing beyond the threads being slightly tapered and slitted longitudinally, said tapering end being adapted for engagement against the annular rib whereby the tapered end is contracted upon the pipe, the outer end of said bushing beyond said threads having exterior annular faces adapted to receive a suitable turning tool whereby said bushing may be moved into the flange.

In testimony whereof I have hereunto set my hand in presence of two subscribing witnesses.

PHILIP MUELLER.

Witnesses:
F. L. RIGGIN,
J. E. TARKABERRY.